Oct. 26, 1937.    J. SCHAUB    2,097,423
EXPELLER
Filed Dec. 6, 1934    2 Sheets-Sheet 1
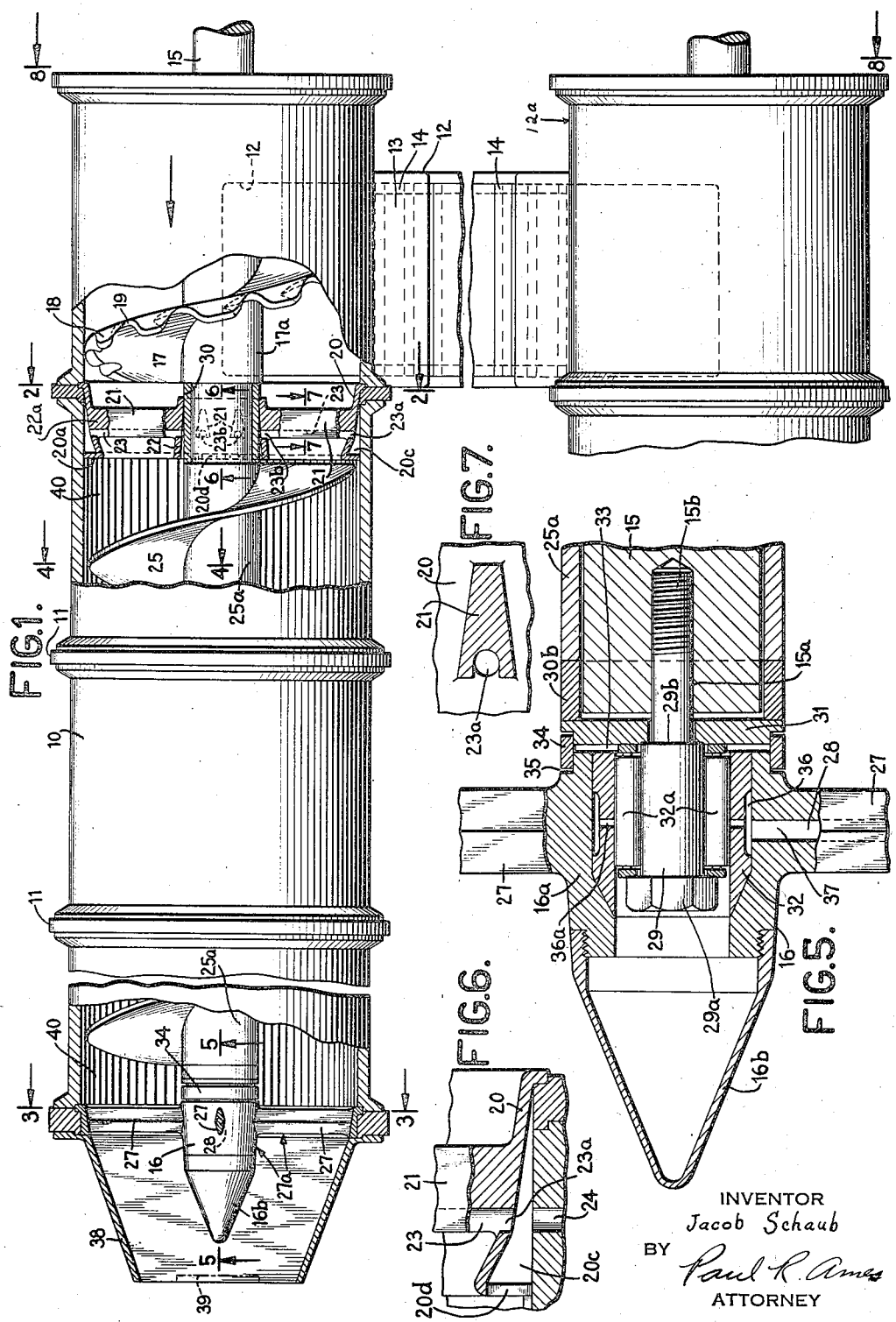
INVENTOR
Jacob Schaub
BY Paul R. Ames
ATTORNEY Oct. 26, 1937.  J. SCHAUB  2,097,423
EXPELLER
Filed Dec. 6, 1934  2 Sheets-Sheet 2
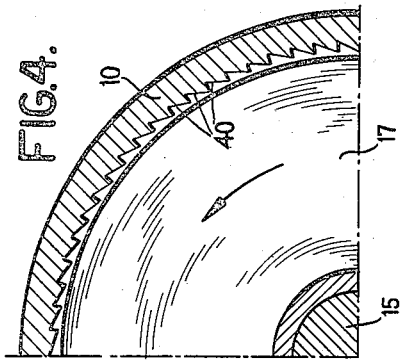
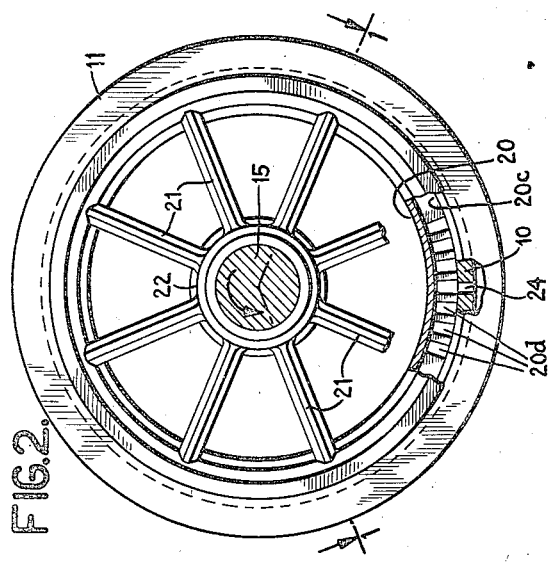
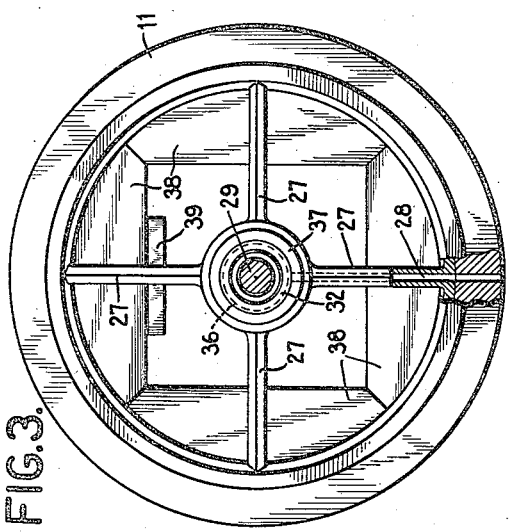
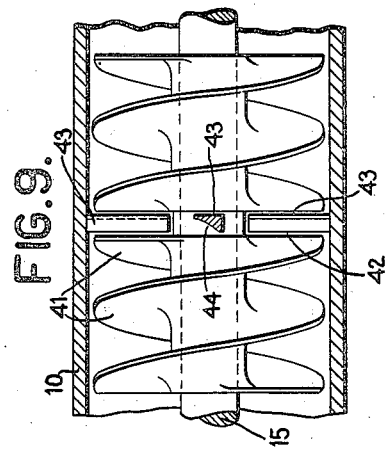
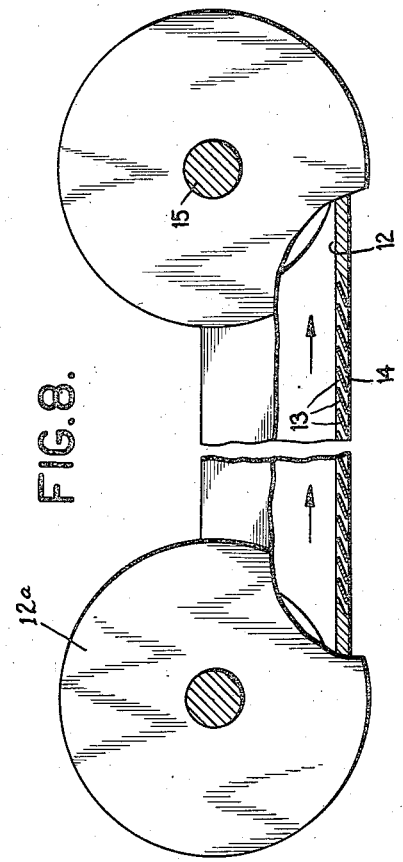
INVENTOR
Jacob Schaub
BY
Paul R. Ames
ATTORNEY Patented Oct. 26, 1937

2,097,423

UNITED STATES PATENT OFFICE 2,097,423

EXPELLER

Jacob Schaub, Westfield, N. J., assignor to The Best Foods, Inc., New York, N. Y., a corporation of Delaware Application December 6, 1934, Serial No. 756,237

18 Claims. (Cl. 31—35)

This invention relates to an improved device for expelling or expressing liquids from plastic masses.

In my copending application, Serial No. 621,651, filed July 9, 1932, now Patent Number 2,077,644, dated April 20, 1937, I have described an apparatus for treating oil-milk emulsion crystals in the production of margarine including a worker or kneader, an expeller, a salter and a blender. The worker or kneader described in that application and in my copending application Serial No. 756,236, filed December 6, 1934, entitled "Working and kneading apparatus" subject the mass of crystals to a series of cutting and rubbing operations whereby the temperature of the crystals is increased and a portion of the free water is liberated from the interstices between the crystals and redistributed throughout the mass. The present apparatus is particularly adapted for use in conjunction with arrangements as described in said application, although it may be used alone or in other arrangements.

It is an object of the present invention to provide an improved device for separating free liquid from a plastic mass containing the same. A further object is to provide a machine which may be used with the working and kneading devices of the aforementioned applications to expel the desired proportion of the free water contained in the plastic mass discharged from such devices. Another object is to provide means for lubricating a bearing within the expeller. Further objects are to provide means for preventing the building up of excessive quantities of crystals on the helical screw conveyor of the expelling device and to provide means for resisting rotation of the plastic mass with the screw conveyor. It is also an object to provide a machine adapted to give the desired shape and degree of compression to the extruded product. Other objects will become apparent.

An important feature of the present device is that the plastic mass containing entrained liquid is subjected to alternate compressions and expansions, means being provided for withdrawing the water liberated while the material is under compression.

In describing the invention reference will be made to the drawings, in which Figure 1 is a top plan view of the device showing portions of the casing broken away to illustrate the construction within and with one of the compression collars shown in section through a set of spokes on the line 1—1 of Figure 2. Figure 2 is a vertical section of the apparatus taken on the line 2—2 of Figure 1, and rotated 90° to illustrate the apparatus in an upright position. Figure 3 is a vertical section similar to Figure 2 but taken on the line 3—3 of Figure 1. Figure 4 is a sectional view of a quarter of the device taken on the line 4—4 of Figure 1. Figure 5 is a detailed sectional view on the line 5—5 of Figure 1, showing the bearing at the end of the drive shaft, the retaining bolt being shown in elevation. Figure 6 is a detailed view on an enlarged scale taken on the line 6—6 of Figure 1. Figure 7 is a detailed section of one of the spokes on an enlarged scale, and taken on the line 7—7 of Figure 1. Figure 8 is an end elevation of the worker and expeller taken on the line 8—8 of Figure 1, and broken away to illustrate the plates for transferring material to the expeller. Figure 9 is a fractional vertical section of a modified form of the device.

In describing the illustrations reference will be made to the numerals, of which 10 designates a cylindrical casing which may be made up of sections between the rings 11, each section of which may be split in half vertically and hinged at the bottom and locked at the top with a locking bolt, as illustrated in Figure 7 of my above mentioned copending application entitled "Working and kneading apparatus". The casing may also be supported upon suitable standards and provided with a drip pan as illustrated in that application.

The first section of the casing 10 may be provided with a horizontal inlet 12, which, in the apparatus described, is in a lower quadrant of the casing just below the plane of the horizontal diameter of the apparatus. This inlet 12 is a continuation of the outlet to the apparatus described in my above mentioned copending application Serial No. 756,236 and is fully described and illustrated therein. The lower surface of this inlet may be made up of a plurality of strips of metal 13 extending across the inlet, which strips slant upwardly toward and are separated at their forward edges. These strips may be supported at their ends upon strips or blocks of metal 14 which may be made by cutting the metal and bending it inwardly to form steps to give the desired slant and separation to the strips 13. These strips 13 may overlap at their edges or they may be slightly spaced. The material to be treated is admitted through this inlet, for example, from a kneader 12a as described in said above mentioned applications, and free water will run down the strips 13 and escape through the slots formed between the overlapping portions of these strips.

Where the use of the worker or kneader 12a is unnecessary, for example as in the manufacture of cotton seed oil margarine, as differentiated from coconut oil margarine, the crystals may be introduced directly into the casing through a suitable opening, for example, in the upper quadrant of the casing.

A shaft 15, driven by any suitable means, such as an electric motor (not shown), extends axially through the casing 10 and is supported at its right hand end, as viewed in Figure 1, in suitable bearings outside of the casing 10 (not shown). The inner end of the shaft is supported in the bearing 16 to be described in detail hereafter. A helical screw 17 is positioned upon the shaft 15 in the section opposite the inlet and adapted to turn with the shaft. This screw may be provided with a cutting edge 18 turned over and sharpened to provide means for cutting into the plastic mass delivered to the expeller and for scraping the sides of the casing. This cutting edge 18 may be also provided with notches 19 which are sharpened on their forward edges and adapted to assist in cutting the stream of plastic material entering through the inlet 12.

Upon rotation of the shaft 15 in a counter-clockwise direction, as viewed from the right of Figure 1, the helical screw 17 advances the material through a collar 20 having an inner surface in the shape of a truncated cone with the outlet end slightly more tapered than the rest of the surface. This collar is provided with an outwardly turned flange 20a leaving a space 20c between the casing 10 and the collar 20. In the lower portion of the flange 20a there are provided a number of notches 20d through which water in the casing 10 may escape back into the space 20c.

Within this collar 20 there are positioned a plurality of spokes 21 extending from the hub 22 which surrounds the shaft 15 and is spaced from it and forming a spider 22a through which the material is forced. This hub is also tapered to increase the compression between the hub 22 and the inner surface of the collar 20. Each of these spokes is tapered toward its front end, or toward the inlet end of the casing 10, and is provided with an open groove 23 in its rear or widened end. The grooves 23 communicate with apertures 23a extending through the collar 20 and apertures 23b extending through the hub 22 to discharge the expelled free water or other liquid into the space 20c between the collar 20 and the casing 10, from which space it escapes through the drain 24. The number of spokes may be more or less, depending upon the amount of working and water extraction required in the device.

The material, after passing through the compression collar 20 is picked up by a second helical screw 25 and is moved forwardly through a second spoked compression collar like the one previously described. As many of these sections may be provided as are necessary to obtain the desired removal of water.

The inner end of the shaft 15 is supported in a bearing 16, which in turn is supported by the spokes 27 forming with the bearing a spider 27a extending between the shaft 15 and the casing 10. These spokes may be tapered at each end and the lower spoke may be provided with a liquid discharge 28 connecting the inner portion of the bearing with the outside of the casing. The inner end of the shaft 15 is drilled and threaded to provide a carefully fitted bearing portion 15a and a threaded portion 15b adapted to receive the end of a bolt 29 having a head 29a and a shoulder 29b. Spacer rings 30 (Figure 1) are provided between the hubs 17a and 25a of the helical conveyors and a spacer 30b extends beyond the end of the shaft 15. A bearing plate 31 is provided between the shoulder 29b and the spacer 30b, whereby the tightening of the bolt 29 will force the spacers together against the hubs of the screw conveyors and against a shoulder (not shown) on the shaft 15 within and at the right hand end of the casing 10. Thus by tightening the bolt 29 the helical conveyors may be held in fixed relation to the shaft 15.

A bearing collar 32 is positioned within the hub 16a of the bearing 16, and a roller bearing 32a is positioned between the bearing plate 32 and the bearing surface of the bolt 29.

In order to lubricate the bearing 16, a space 33 is provided between the plate 31 and the bearing collar 32. This space is covered by a loosely fitting ring 34 sliding in a groove 35 formed in the bearing plate 31 and the fixed hub 16a and which groove is wider than the said ring 34 so that the latter is free to move back and forth in the groove 35 as it is intermittently rotated by the rotation of the shaft 15. The bearing collar 32 is provided with a space 36 having holes 36a communicating at various places with the space surrounding the roller bearing 32a. This space also communicates through the hole 37 in the hub 16a with the opening 28 in the lower spoke 27 of the spider 27a. A conical cap 16b may be threaded to the end of the hub 16a to close the outer end of the bearing 16.

With the bearing described above a portion of the plastic mass and liquid will work under the slip ring 34 through the passage 33 into the bearing 32a, where it serves as a lubricant for the bearing. This plastic mass and liquid are then forced out through the outlets 36a and the space 36 and the holes 37 and 28 and discharged outside of the casing 10.

The outlet end of the casing is tapered as illustrated at 38 to increase the back pressure and provide a compact extruded mass. The outlet of this tapered portion may be shaped to form the mass into a square, or other desired shaped block. If the device is to be used with a salter as described in my Patent Number 2,077,644; this outlet is preferably provided with a portion 39 projecting downwardly, as shown in Fig. 3 (diagrammatically indicated in Fig. 1), to form a groove in the top of the cake of extruded material to receive the salt and milk in the salter. Or if it is desired to break the mass up, the outlet may be provided with wires or bars extending across the opening to cut the mass into the desired sized pieces. If further separation of water is desired it is preferred to have one of the said cutting bars on the center line of the outlet because the bearing 16 leaves a small hole through the center of the mass which collects a considerable quantity of the free water remaining in the mass. By cutting on this line the water in this hole may be readily separated.

The inner surface of the casing 10 is preferably provided with a series of notches or ridges 40 extending longitudinally thereof and adapted to resist turning of the mass of the material with the screw, thus assisting in giving a forward motion to the plastic material. The rate of rotation of the shaft 15 should be such as to cause the minimum of slippage around the casing at this point. In the section provided with these ridges it is preferred to omit the turned over cutting edges from the helical screws in order to avoid restricting the outward pressure of the plastic material against the ridges of the casing.

In some instances, particularly in the first sections of the device and before free water is liberated, the mass will stick to the conveyor and tend to build up between the convolutions of the worm, thus diminishing the effective volume of the conveyor. This effect may be retarded by forming the valleys of the helical screw with a taper toward the shaft, or with their bottom portions curved, so as to resist the tendency to pack toward the center of the conveyor. Also, if desired, the worm and shaft may be water-jacketed and warm water may be supplied to the inner surface to soften the mass at this point.

In the modification shown in Figure 9 a double helical screw 41 is shown on the shaft 15. At a point about one turn from the beginning of the conveyor the blades are cut away as illustrated at 42 and plow studs 43, fixed to the casing 10, extend into the cut away portions. These plow studs 43 are each provided with a curved directing face 44 shaped to shear off the mass and direct it toward the outlet end of the expeller. In the illustration four plow studs have been indicated but it is apparent that any suitable number of these may be provided. A double helical screw may be used in place of the single helical screws 17 and 25 if desired.

In the operation of this device the plastic mass above mentioned, for example, from a device 12a as described in my application entitled "Working and kneading apparatus", is fed into the inlet 12, any free water escaping through the slots between the plates 13 or the crystals from the chill bath or chill rollers may be led directly into the casing 10. When a plastic material is fed it is cut off by the cutters 18 and notches 19 and advanced by the helical screw 17 through the tapered collar 20. The tapered collar 20 and the tapered spokes 21 and hub 22 bring about a compression of the material, which compression is released as the material reaches the further end of the collar. As the material passes around the spokes 21 a space is left behind the widened end of the spokes so that the water expelled by the compression may flow into the grooves 23. The back pressure caused by the increased slope of the inner surface of the collar 20 will assist in forcing this water into these grooves. A portion of the water liberated in the operation will be forced out through the openings in the collar 20 directly to the space 20c. The water forced through the openings in the hub 22 will pass between it and the spacer 30 and fall to the bottom of the casing where it will flow through the openings 20d into the space 20c and, with the rest of the water, out through the outlet 24.

The mass of material which has expanded into the enlarged space following the collar, is picked up by the screw conveyor 25 and advanced through the next section, where the compression and release of compression are repeated, the expelled water being allowed to escape in a similar manner. This may be repeated as many times as required to obtain the desired removal of water and the material may then be compressed in the tapered outlet 38 and the shaping member therebeyond, to give the desired shape and degree of compression in the extruded stream of material. A portion of the plastic mass may be forced through the bearing 16 and the hole 28 in the lower spoke and discharged outside of the casing, thus providing lubrication for this bearing.

If desired, salt or other seasoning material may then be applied to the plastic mass, for example, as illustrated in my Patent Number 2,077,644; and the material may be subjected to a further kneading and mixing to thoroughly blend the seasoning materials with the mass.

Other uses of the invention will be apparent and it is not intended to restrict the invention to the particular illustration shown and described. For example, in some cases it may be desirable to place perforated plates in the path of the material as it approaches some or all of the tapered collars, thus giving additional working and rubbing of the particles. Also it is obvious that in the treatment of different materials modifications in the construction of the apparatus may be desirable or necessary and that the individual features described in this application may be used alone or together in different combinations and with different devices for obtaining particular desired effects.

The terms used in describing and claiming the invention have been used as terms of description and not as terms of limitation and it is intended that all equivalents thereof be included within the scope of the appended claims.

I claim:

1. In a device of the type described, a casing having therein a plurality of sections of reduced cross section and a plurality of alternate sections of larger cross section, means for forcing a plastic material containing free liquid through said first named sections into said second named sections, and discharge outlets for liquid in each of said second named sections.

2. A device as defined in claim 1 in which the casing is cylindrical and the means for forcing the plastic material is a helical screw.

3. In a device of the type described, a casing, said casing having therein a portion of reduced cross section, means for forcing a plastic material containing free liquid through said portion, and a tapered projection, flared in the direction of movement of the material, positioned in said portion, said tapered projection having a passage for liquid communicating with the outside of the casing and positioned in the flared end of said projection.

4. In a device of the type described, a casing having therein a portion of reduced cross section, means for forcing a plastic material containing free liquid through said portion, and a plurality of spokes extending inwardly from said portion, said spokes being of a cross-section which is tapered toward the inlet end of the casing and having passages for liquid communicating with the outside of the casing positioned in the flared end of said spokes.

5. In a device of the type described, a casing, a collar of frustro-conical shape positioned in said casing with the wider opening toward the inlet end of the device, a plurality of spokes of tapered cross section in said collar, the narrow ends being toward the inlet of said casing, means for forcing a plastic material containing a free liquid through said collar, and passages for liquid communicating with the outside of said casing, said passages being positioned in the flared ends of said spokes.

6. A device as described in claim 5 in which the casing is cylindrical and the means for forcing the material is a helical screw.

7. In a device of the type described, a casing, a plurality of collars of frustro-conical shape positioned in said casing with their wider openings toward the inlet end of the casing, a plurality of spokes of tapered cross section in each of said collars, the narrow ends of said spokes being toward the inlet of the casing, means for forcing a plastic material containing a free liquid through said collars and passages for liquid communicating with the outside of said casing, said passages being positioned in the flared ends of said spokes.

8. A device as defined in claim 3 in which the casing is cylindrical and the means for forcing the material comprises a screw conveyor on a shaft, said shaft having a bearing positioned within said casing and said bearing having means for passage therethrough of a portion only of the material being treated.

9. The combination with a device for working margarine, of a device for expelling water therefrom and a plurality of plates between the worker and the expeller over which the worked material passes on its way from the worker to the expeller, said plates being separated to provide slots between them, each of said plates slanting downwardly toward the worker.

10. In a device of the type described, a casing having therein a portion of reduced cross section, a shaft carrying conveyors adapted to force a plastic material through said portion of reduced cross section, bearing members in said casing for said shaft and means for forcing a part of said mass between said bearing members and discharging such part through an outlet independent of the main outlet of said casing, the remainder of the mass being forced through the casing without passing between said bearing members.

11. In a device of the type described, a casing having therein a section of reduced cross section, a helical conveyor for conveying a plastic material through said section of reduced cross section, said helical conveyor having a section cut out intermediate its ends and a plow stud fixed to said casing, said plow stud having a blade with a surface substantially perpendicular to the axis of the conveyor and a second surface at an acute angle to said first surface adapted to direct the plastic material toward the outlet end of said casing.

12. In a device of the type described, a casing, means for forcing plastic material containing free liquid through said casing, a tapered projection in said casing flared in the direction of movement of the material and having a passage for liquid communicating with the outside of the casing and positioned in the flared end of said projection.

13. A device as defined in claim 12 in which the projection is formed with a longitudinally extending groove in the flared end thereof.

14. In a device of the type described, a casing having an inlet and an outlet, a plurality of collars of frusto-conical shape spaced apart within said casing with the wider openings toward the inlet end of the device, a plurality of spokes of tapered cross section in said collars, the narrow ends thereof being toward the inlet end of the device, passages for liquid communicating with the outside of said casing and positioned in the flared ends of said spokes, a shaft within the casing, means on said shaft for forcing material through the collars, and a bearing for said shaft positioned adjacent the outlet end of the casing and tapered in the direction of said outlet.

15. A device as defined in claim 5 in which a portion of the collar extends toward the outlet of the casing beyond the flared ends of the spokes.

16. A device as defined in claim 5 in which a portion of the collar extends toward the outlet of the casing beyond the flared ends of the spokes, said portion having an increased slope to assist in forcing water out through the passages.

17. A device as defined in claim 5 in which a space is formed between the collar and the casing communicating with the passages in the spokes and with openings in the end of the collar toward the outlet of the casing.

18. A device as defined in claim 10 in which a loose ring is provided at the end of the shaft adjacent the bearing members and arranged so that the part of the plastic mass passing between the bearing members passes under said ring.

JACOB SCHAUB.